United States Patent [19]

Geschonke et al.

[11] 4,377,672
[45] Mar. 22, 1983

[54] PROCESS FOR THE POLYMERIZATION OF VINYL CHLORIDE ACCORDING TO THE MICROSUSPENSION PROCESS

[75] Inventors: Hans Geschonke; Ulrich Goetze; Kurt Kreilein, all of Pulheim, Fed. Rep. of Germany

[73] Assignee: Wacker Chemie GmbH, Munich, Fed. Rep. of Germany

[21] Appl. No.: 116,218

[22] Filed: Jan. 28, 1980

[30] Foreign Application Priority Data

Mar. 22, 1979 [DE] Fed. Rep. of Germany ....... 2911333

[51] Int. Cl.$^3$ ............................ C08F 2/26; C08F 2/20; C08F 14/06
[52] U.S. Cl. .................................. 526/203; 526/214; 526/344.2; 526/344.3
[58] Field of Search ............... 526/201, 203, 209, 214, 526/225

[56] References Cited

U.S. PATENT DOCUMENTS

| | | | |
|---|---|---|---|
| 2,559,752 | 7/1951 | Berry | 526/193 |
| 3,258,453 | 6/1966 | Chi | 526/201 |
| 3,324,097 | 6/1967 | Pears | 526/207 |
| 3,391,099 | 7/1968 | Punderson | 526/214 |
| 3,642,732 | 2/1972 | Yasumura | 526/201 |
| 3,668,165 | 6/1972 | Bergmeister | 526/202 |
| 3,696,079 | 10/1972 | Possberg | 526/344.2 |
| 3,697,493 | 10/1972 | Meyer | 526/201 |
| 3,706,705 | 12/1972 | Koyanagi | 526/200 |
| 3,714,097 | 1/1973 | Cautilli | 526/201 |
| 4,073,779 | 2/1978 | Wiest | 526/258 |
| 4,128,516 | 12/1978 | Geschonke | 260/29.6 R |

FOREIGN PATENT DOCUMENTS 2757168 7/1979 Fed. Rep. of Germany .. 260/29.6 R

*Primary Examiner*—C. A. Henderson
*Attorney, Agent, or Firm*—Hammond & Littell, Weissenberger and Muserlian

[57] ABSTRACT

The subject of the invention is a microsuspension polymerization in water of vinyl chloride, which is carried out in the presence of monomer-soluble radical-initiators and emulsifiers. According to the invention, from about 0.01 to 0.5% by weight, based on the weight of the water, of polymers containing mono-basic or dibasic carboxylic acid units and/or salts thereof are added. Furthermore, in a preferred embodiment, emulsifiers containing perfluorinated alkyl groups are also used. Stabilization of the microsuspension latex, which is per se sensitive to shearing action, and reduction in the amount of emulsifiers used are achieved.

9 Claims, No Drawings

PROCESS FOR THE POLYMERIZATION OF VINYL CHLORIDE ACCORDING TO THE MICROSUSPENSION PROCESS

BACKGROUND OF THE INVENTION

For the manufacture of paste polyvinyl chloride, vinyl chloride is often polymerized according to the microsuspension process. According to this process, the vinyl chloride, together with the monomer-soluble radical-initiators and emulsifiers, is homogenized extensively in water prior to polymerization and then subjected to polymerization with or without stirring. The polyvinyl chloride latices so produced are not very stable and tend to coagulate and form grit. This problem of instability has become increasingly important as a result of more strigent regulations relating to environmental pollution since, following polymerization, so-called intense degassing operations have to be carried out to remove non-polymerized vinyl chloride from the latices. These degassing operations subject the latex to stress and often cause further coagulation.

The problem of instability can be solved by using emulsifiers having a better emulsifying action or higher concentrations of emulsifier. This, however, lowers the quality of the paste polyvinyl chloride. For example, the water absorption of the finished product is increased as a result of such measures. It is the emulsifiers having only a moderate emulsifying action, for example, alkali metal and ammonium salts of carboxylic acids, that result in excellent paste polyvinyl chloride products for the manufacture of especially transparent and water-resistant coatings.

A further attempt at solving the problem has been to use protective colloids in addition to the emulsifiers. Although this produces more stable latices, at the same time the quality of the polyvinyl chloride so obtained is impaired. Thus, for example, the viscosities of the resulting polyvinyl chloride pastes are thereby increased. Such increases in viscosity are not, however, desirable.

OBJECTS OF THE INVENTION

It is an object of this invention to provide an improved process for the preparation of paste polyvinyl chloride.

It is also an object of this invention to provide an improved process for the microsuspension polymerization of vinyl chloride monomer.

It is further an object of this invention to provide additives for the microsuspension polymerization of vinyl chloride monomer which, on the one hand, effect a stabilization of the polyvinyl chloride latex and, on the other hand, do not have any adverse effects on the end-products, paste polyvinyl chloride.

These and other objects of the invention will become more apparent in the discussion below.

DESCRIPTION OF THE INVENTION

This invention is directed to a process for the preparation of polyvinyl chloride according to the microsuspension process by polymerization of vinyl chloride, optionally with further α-olefinically unsaturated monomers in amounts of up to about 20% by weight of the vinyl chloride content, with monomer-soluble radical-initiators and water-soluble emulsifiers and, optionally, with further customary auxiliary substances in the pre-homogenized aqueous phase, characterized in that the polymerization takes place in the presence of from about 0.01 to 0.5% by weight, based on the weight of the water, of polymers containing monobasic or dibasic carboxylic acid units and/or salts thereof.

More particularly, the present invention relates to an improvement in the process for the manufacture of polyvinyl chloride according to the microsuspension process by the polymerization of vinyl chloride, optionally with α-olefinically unsaturated monomers copolymerizable with vinyl chloride in amounts of up to 20% by weight of the vinyl chloride content, in water in the presence of monomer-soluble radical-initiators using water-soluble emulsifiers and, optionally, further auxiliary substances in the pre-homogenized aqueous phase, the improvement consisting of employing from 0.01 to 0.5% by weight, based on the water, of a water-soluble acidic polymer containing monobasic or dibasic carboxylic acid units and water-soluble salts thereof in the pre-homogenized aqueous phase. In a preferred embodiment, from about 0.3 to 3% by weight, based on the weight of the water, of alkali metal and/or ammonium carboxylic acids having from about 8 to 20 carbon atoms are used as emulsifiers.

The microsuspension process has frequently been described in the literature, such as, for example, in German Published Application (DE-AS) No. 10 69 387. A very finely particulate monomer dispersion is produced from the monomer to be used, an oil-soluble catalyst, emulsifiers or further auxiliary substances such as, for example, buffer substances, and water. This dispersion is then polymerized at temperatures between approximately 30° and 80° C., usually under the auto-genous pressure of the monomer at approximately 5 to 13 bar. Pre-emulsification can be achieved by various types of apparatuses, such as, for example, colloid mills, high-speed pumps, vibrator agitators, ultrasonic devices, nozzles, and high-speed stirrers which fling the mixture against baffle plates.

Suitable catalysts include oil-soluble radical-initiators in amounts of from about 0.01 to 3% by weight, preferably from about 0.02 to 0.3% by weight, based on the weight of the monomers. Examples of these catalysts are dialkyl, diaryl, or diacyl peroxides, such as, for example, dilauroyl, dimyristyl, or dicetyl or distearyl perioxide; peresters, such as, for example, tert-propyl peracetate, tert-butyl peracetate, tert-butyl peroctoate, and tert-butyl perpivalate; dialkyl peroxydicarbonates, such as, for example, diisopropyl, diethyl, dihexyl, dicyclohexyl and dialkylcyclohexyl peroxydicarbonates, bis-(4-tert-butylcyclohexyl)-peroxydicarbonate, and especially dialkyl peroxydicarbonates having alkyl chain lengths of from $C_8$ to $C_{18}$; mixed anhydrides of organic sulfo peracids and organic acids, such as, for example, acetylcyclohexylsulphonyl peroxide; and also azo compounds known as polymerization initiators, such as, for example, azoisobutyronitrile and azovaleronitrile. Mixtures of radical-initiators are also frequently used.

In principle, a great number of different types of emulsifiers are suitable. They are generally used in amounts of from about 0.1 to 5% by weight, based on the weight of the water, preferably from about 0.3 to 3% by weight. Both ionic and non-ionic emulsifiers may be used. The ionic emulsifiers are preferably anionic substances, such as, for example, alkyl sulphonates and alkyl sulphates such as, for example, sodium dodecyl sulphate, or phosphoric acid alkyl esters such as, for example, sodium diethylhexyl phosphate. Preferred, however, are the alkali metal salts, especially sodium and potassium, and/or the ammonium salts of fatty acids having from about 8 to 18 carbon atoms. The fatty acids may be substituted, especially by hydroxyl groups. Such products are often manufactured by oxidizing unsaturated fatty acids, for example with peracetic acid. Examples of non-ionic emulsifiers are fatty acid partial esters of polyhydric alcohols, such as glycerin monostearate, sorbitol monolaurate or sorbitol palmitate, fatty alcohol partial ethers of polyhydric alcohols, polyoxyethylene ethers of fatty alcohols or aromatic hydroxyl compounds, and polyethylene oxide and/or polypropylene oxide condensation products.

Further auxiliary substances are, for example, buffer substances, such as sodium carbonate, sodium bicarbonate, alkali metal acetates, or alkali metal phosphates, or molecular-weight regulators, such as aliphatic aldehydes, chlorinated hydrocarbons, or isobutylene.

The process of the invention herein is also applicable to procedures wherein copolymers are prepared that contain up to about 20% by weight of ethylenically-unsaturated monomers copolymerizable with vinyl chloride. Examples of such unsaturated monomers are vinyl halides such as, for example, vinyl fluoride, vinyl bromide, vinylidene fluoride, or vinylidene chloride; vinyl esters or organic acids having from 2 to 18 carbon atoms, especially vinyl alkanoates having 2 to 18 carbon atoms in the alkanoate, such as vinyl acetate, vinyl propionate, or vinyl laurate; acrylic compounds, especially (meth)acrylic acid esters; fumaric acid monoesters and diesters; and maleic acid monoesters and diesters. Naturally, mixtures of these unsaturated monomers can be used.

Polymerization can be carried out in conventional autoclaves, both stirred autoclaves and autoclaves without stirring apparatus being suitable.

The additives used according to the invention, that is, polymers that contain monobasic or dibasic carboxylic acid units and/or salts of the polymers in homopolymerized form, are generally added to the aqueous liquor before homogenization of the total mixture. Examples of such polymers are homopolymers and copolymers of acrylic acid, methacrylic acid, fumaric acid, maleic acid, and anhydrides of such acids, itaconic acid, and copolymers of said acids having up to about 80% by weight of other olefinically-unsaturated monomers. Examples of such comonomers are styrene; olefins, such as, for example, ethylene or propylene; vinyl esters, such as, for example, vinyl acetate; and vinyl ethers, such as, for example, methyl vinyl ether and vinyl octadecyl ether. For every five units of comonomer in the copolymers at least one unit having carboxylic acid groups should be present. The upper limit is often two carboxylic acid groups to one comonomer unit. Preferred copolymers are those which contain two monomer units per carboxylic acid group to copolymers that contain one monomer unit to 1.5 carboxylic acid groups. So-called 1:1-copolymers are frequently used, that is, copolymers which contain one comonomer unit per carboxylic acid group unit. Examples of such copolymers having a 1:1 ratio are maleic-acid anhydride copolymers with styrene, ethylene, or vinyl methyl ether. The maleic acid anhydride copolymers result in splitting off of the anhydride group in water to form the corresponding bi-functional carboxylic acid units. If desired, of course, a few maleic acid anhydride units may still be present in unsplit form. A further notable polymer having carboxylic acid groups is polyacrylic acid.

Most of the above-described polymers are water-soluble or at least alkali-soluble due to the high number of carboxylic acid groups. When they are dissolved in an alkaline medium, the corresponding alkali metal salts, especially sodium and potassium salts, and ammonium salts are formed.

The addition, used in amounts of from about 0.01 to 0.5% by weight, based on the weight of the water, of these polymers containing carboxylic acid units has very important advantages for microsuspension polymerization. The latices so produced have decisively improved stability. In general, even the amount of emulsifiers used can be reduced by from about 10 to 20% in comparison with normal amounts while still achieving the necessary stability. On the other hand, as a result of the addition, no grit is formed nor is there any coagulation, even under more rigorous degassing conditions. This means a significant increase in the yield of high-quality product. The fact that the additives mentioned do not adversely affect the quality of the product is especially important with regard to the applicability of the invention. Thus, for example, water-resistance is not impaired but rather is improved when smaller quantities of emulsifier are used. In addition, as a result of the lower emulsifier content, the transparency properties and also the viscosity properties of the finished plastisols can be improved. It is also surprising that polymerization can be carried out in conventional stirred autoclaves without running the risk of causing the latices to coagulate as a result of the shearing action of the stirrer. The advantage of stirred autoclaves as compared with unstirred autoclaves is that, due to better heat dissipation, increased production output can be achieved.

The invention is especially important in connection with ammonium and/or alkali metal salt of carboxylic acid emulsifiers since, although these provide very high-quality products, due to their merely moderate emulsifying action they have hitherto presented very great problems with regard to the stability of the latices in connection with intense degassing. Even in the case of these emulsifiers which are unsatisfactory with regard to their emulsifying action, the addition according to the invention makes it possible to use stirred autoclaves and still achieve a reduction in the amount of emulsifiers. The vinyl chloride degassing can also be carried out without any problems.

A preferred embodiment of the invention consists of an emulsifier having at least one perfluorinated alkyl group having a chain length of from about 6 to 20 carbon atoms additionally being used. The emulsifier may be ionic, i.e., anionic or cationic, or non-ionic. It is used in amounts of from about 0.001 to 0.1, preferably from about 0.005 to 0.05 percent, by weight, based on the weight of the water. Even these small amounts make it possible to further reduce the emulsifier content of the microsuspension mixture—in the maximum case up to 50%—without significantly sacrificing stability. On the contrary, the same advantageous effects with regard to the quality of the product that have already been described can be achieved to an even greater extent by further reducing the emulsifier content. In addition, it has also been found that the fluorine-containing additive prevents coating of the autoclave walls. Examples of such additives having perfluorinated alkyl chains are perfluoroalkyl sulfonates; perfluoroalkylcarboxylic acid alkoxylates, for example, ethoxylates; perfluoroalkyl alkoxylates; and quaternary ammonium salts of perfluoroalkylsulfonic acids. Preferable, the alkyl chains thereof have a chain length of from about 8 to 18 carbon atoms, and the molecule carries a hydrophilic radical, optionally separated by a hydrocarbon radical. Such compounds are described in detail in German Published Application (DE-OS) No. 26 05 203, incorporated herein by reference.

As a result of use of the additives according to the invention, advantages have been found also with regard to the possible methods of working up. There are two fundamentally different methods. On the one hand, the latex is precipitated and filtered. As a result, a substantial part of the additives, especially the emulsifiers, is removed with the aqueous phase, and the finished polyvinyl chloride contains less emulsifier. This method of working up is admittedly cost-intensive but it results in an excellent product with regard to transparency and water-resistance. As a result of the measures according to the invention, since even less emulsifier is used, an even better product is obtained.

On the other hand, the latex is either spray-dried or roller-dried. In this case, the additives remain in the end-product. This normally means a reduction in quality as compared with the working-up method mentioned above but the working-up process itself is simpler. As a result of the additives according to the invention, the emulsifier content can be reduced, as described, to such an extent that, even with the simplified method of working up, products can be obtained that, according to the previously known state of the art, could be obtained only with the filtration method of working up. Since working up also affects the particle size distribution of the finished polyvinyl chloride, as a result of the possible variation of working up a more specific particle size distribution can be obtained even in high-quality products.

The following examples are intended to illustrate the invention and are not to be construed as limiting the invention thereto.

Comparison Example A

A mixture consisting of 5,000 kg of vinyl chloride, 6,000 liters of an aqueous liquor containing 60 kg of ammonium laurate, and 9 kg of dilauroyl peroxide was homogenized by forcing it through nozzles at a pressure of 20 bar by means of multi-state centrifugal pumps. The resulting emulsion was poured into an unstirred autoclave.

Following reaction over a period of 20 hours at 50° C. and subsequent degassing to a residual monomer content of 10,000 ppm of vinyl chloride (based on the solids), a stable latex having a 42% solids content was obtained. When this latex was worked up by filtration, subsequent drying, and classifying, a powder was obtained which could be stirred with dioctyl phthalate to form a low-viscosity plastisol. (See Table II below).

Comparison Example B

The procedure of Comparison Example A was followed except that the latex was degassed more intensely by means of steam to a residual monomer content of 500 to 1,000 ppm of vinyl chloride. The stability was severely reduced, so that coagulation phenomena could occur, which in turn made filtration impossible.

Comparison Example C

A latex copolymerized in accordance with Comparison Example A with 78 kg of ammonium laurate was degassed in accordance with Comparison Example B. The latex was sufficiently stable although it did not have the quality obtained according to Comparison Example A. Filtration without any problems was possible.

EXAMPLE 1

Polymerization was carried out in accordance with the procedure of Comparison Example A with 60 kg of ammonium laurate as the emulsifier and, in addition, with 1.5 kg of an alternating copolymer of styrene and maleic acid anhydride, in ammoniacal solution. Following intense degassing in accordance with Comparison Example B, the latex was just as stable as that obtained in accordance with Comparison Example A with normal degassing.

EXAMPLE 2

Polymerization was carried out in accordance with Example 1. The aqueous liquor contained 48 kg of ammonium laurate and, as in Example 1, 1.5 kg of an alternating copolymer of styrene and maleic acid anhydride. The stability of the latex was just as good as that obtained in accordance with Example 1.

EXAMPLE 3

Polymerization was carried out as described in Examples 1 and 2. The aqueous liquor contained 36 kg of ammonium laurate, 1.5 kg of an alternating copolymer of styrene and maleic acid anhydride, and 1.5 kg of a 30% solution of sodium perfluoroalkyl sulfonate ("Monflor 31" manufactured by Atlas-Chemie).

In spite of the reduction in the amount of emulsifier, no reduction in the stability of the latex could be detected in the intense degassing operation. The amount of the polymer deposits was noticeably less than in the case of batches without the addition of the fluorinated surfactant.

Comparison Example D

Examples 1 and 2 were modified by using 1.5 kg of methylcellulose as a protective colloid. The stability of the latex after intense degassing remained good. The viscosity of a plastisol consisting of the polyvinyl chloride powder manufactured according to this formulation was substantially higher as compared with those of Comparison Examples A, B, and C and also Examples 1 to 3. (See Table II below).

Comparison Example E

The procedure of Comparison Example D was followed except that polyvinyl alcohol was used instead of methylcellulose. The viscosity of a plastisol manufactured from the polyvinyl chloride powder produced was as high as in Comparison Example D. (See Table II below).

Comparison Example F

A mixture consisting of 900 kg of vinyl chloride, 1,000 liters of aqueous liquor containing 10 kg of ammonium laurate, and 2 kg of dilauroyl peroxide was homogenized in accordance with Comparison Example A and poured into a stirred autoclave. After reaction for ten hours at 50° C. with gentle stirring, polymerization was complete. Irrespective of the subsequent degassing process, the latex obtained contained 70% by weight of grit. Therefore, it could not be used for further working up.

It was not possible to find a way of producing a usable latex by altering the stirring conditions.

EXAMPLE 4

Following the procedure of Comparison Example F, polymerization was conducted whereby 0.5 kg of an alternating copolymer of styrene and maleic acid anhydride in ammoniacal solution was also used. With gentle stirring, a practically grit-free latex was produced after polymerization. It was apparent from the polymerization times that double the production output can be obtained with stirred autoclaves as compared with unstirred autoclaves.

Comparison Example G

A mixture consisting of 850 parts of vinyl chloride, 850 parts of aqueous liquor containing 1% by weight of sodium lauryl sulfate, and 2 parts of dilauroyl peroxide was homogenized by forcing it through an orifice nozzle three times in succession at a pressure of 18 bar. The resulting emulsion was poured into an unstirred autoclave, and polymerization was carried out at 50° C. After intense degassing, a stable latex was obtained.

EXAMPLE 5

The procedure of Comparison Example G was used with the modifications that the aqueous liquor contains 0.5% by weight of sodium lauryl sulfate and that that, in addition, 0.05% by weight, based on the weight of the aqueous liquor, of a copolymer of methyl vinyl ether and maleic acid anhydride (1:1 ratio) and 0.03% of a 30% solution of sodium fluoroalkyl sulfonate were used (product name "Gantrez AN" manufactured by GAF). After intense degassing, the stability of the latex was good.

EXAMPLE 6

A mixture consisting of 850 parts of vinyl chloride, 850 parts of aqueous liquor containing 0.5% by weight of sodium lauryl sulfate, 0.05% by weight of polyacrylic acid (product name "Rohagit S" manufactured by Röhm) and also 0.01% by weight of perfluoroalkyl-polyethyleneoxide-perfluoroalkylate ("Monflor 51" manufactured by Atlas-Chemie) and 2 parts of dilauroyl peroxide was homogenized according to the procedure of Comparison Example G. The stability of the latex after intense degassing was good.

Comparison Example H

The procedure of Comparison Example G was modified by using sodium alkylaryl sulfonate as the emulsifier instead of sodium lauryl sulfate. The stability of the latex after intense degassing was good.

EXAMPLE 7

The procedure of Comparison Example H was modified by reducing the amount of emulsifier by half and by using, in addition, 0.05% by weight based on the weight of the aqueous liquor, of an alternating copolymer of styrene and maleic acid anhydride in ammoniacal solution. The stability of the latex after intense degassing was adequate.

EXAMPLE 8

In addition to the formulation described in Example 7, 0.01% by weight, based on the weight of the aqueous liquor, of perfluorocarboxylic acid polyethylene oxide ("Monflor 51" manufactured by Atlas-Chemie) was used. The stability of the latex after intense degassing was good.

The preparation procedures of the different examples above and the characteristics of the resulting latexes are summarized in the following table:

TABLE I

| Comparison Example/ Example No. | Autoclave | Emulsifier | Protective colloid or additive | Fluorinated Surfactant | Degassing | Latex Stability |
|---|---|---|---|---|---|---|
| A | without stirrer | 1% | — | — | normal | good |
| B | " | 1% | — | — | intense | bad |
| C | " | 1.3% | — | — | " | adequate |
| 1 | " | 1% | 0.025% PS/MAA | — | " | good |
| 2 | " | 0.8% | " | — | " | good |
| 3 | " | 0.6% | | 0.03% MF 31 | " | good |
| D | " | 0.8% | 0.025% MC | — | " | good |
| E | " | 0.8% | 0.025% PVA | — | " | good |
| F | with stirrer | 1% | — | — | — | only grit |
| 4 | " | 1% | 0.05% PS/MAA | — | intense | good |
| G/H | without stirrer | 1% | — | — | " | good |
| 5 | " | 0.5% | 0.05% PMVE/MAA | 0.03% MF 31 | " | good |
| 6 | " | 0.5% | 0.05% PAA | 0.01% MF 51 | " | good |
| 7 | " | 0.5% | 0.05% PS/MAA | — | — | adequate |
| 8 | " | 0.5% | 0.05% PS/MAA | 0.01% MF 51 | — | good |

PS/MAA = 1:1-copolymer of styrene and maleic acid anhydride
MC = methylcellulose
PVA = polyvinyl alcohol
PMVE/MAA = 1:1-copolymer of methyl vinyl ether and maleic acid anhydride
PAA = polyacrylic acid
MF = "Monflor"

The viscosities of plastisols comprising, respectively, 100 parts of polyvinyl chloride prepared according to the examples and 65 parts of dioctyl phthalate at 25° C., were measured in a rotating viscometer "Haake-Rotavisko". The viscosities are set forth in the following table:

TABLE II

| Comparison Example/ Example No. | Viscosity in cP at shearing rate D = | | | | |
|---|---|---|---|---|---|
| | 1.4 | 6.3 | 57.6 | 230 | 461 (sec$^{-1}$) |
| A | 1500 | 1500 | 2000 | 3000 | 5000 |
| B | 1600 | 1500 | 2200 | 3500 | 6000 |

TABLE II-continued

| Comparison Example/ Example No. | Viscosity in cP at shearing rate D = | | | | |
|---|---|---|---|---|---|
| | 1.4 | 6.3 | 57.6 | 230 | 461 (sec$^{-1}$) |
| C | 1600 | 1600 | 2100 | 3200 | 5500 |
| 1 | 1400 | 1550 | 2050 | 3100 | 6200 |
| 2 | 1450 | 1600 | 2150 | 3150 | 5900 |
| 3 | 1550 | 1650 | 2200 | 3400 | 5700 |
| D | 8000 | 7000 | 4000 | 4500 | 6000 |
| E | 8500 | 7500 | 4000 | 4200 | 5500 |
| G | 2000 | 2000 | 3000 | 4000 | 6000 |
| 5 | 2500 | 2300 | 3500 | 5000 | 5600 |
| 6 | 2300 | 2100 | 3000 | 4000 | 5700 |
| H | 1800 | 2000 | 3100 | 5600 | 6000 |
| 7 | 2000 | 2200 | 3200 | 6000 | 5900 |
| 8 | 1900 | 2100 | 3000 | 5400 | 5800 |

A gelled film was manufactured from a paste consisting of 100 parts by weight of polyvinyl chloride and 65 parts by weight of dioctyl phthalate. After storage for four days in water at 23° C., the percentage increase in weight, i.e., water absorption, was determined. The residual emulsifier content and water absorption are set forth in the following table:

TABLE III

| Comparison Example/ Example No. | Working up | Residual Emulsifier (%) | Water Absorption (%) |
|---|---|---|---|
| A, B, 1 | filtration/drying | 0.6 | 0.3 |
| A, B, 1 | spray or roller drying | 1.2 | 1 |
| C | filtration/drying | 0.8 | 0.5 |
| 2 | filtration/drying | 0.5 | 0.3 |
| 2 | spray or roller drying | 1 | 1 |
| 3 | filtration/drying | 0.4 | 0.2 |
| 3 | spray or roller drying | 0.7 | 0.4 |
| G, H | spray or roller drying | 1.1 | 1.1 |
| 5, 6, 8 | spray or roller drying | 0.6 | 0.3 |

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. In the process for the manufacture of vinyl chloride polymers or copolymers according to the microsuspension process by the polymerization of vinyl chloride monomers or vinyl chloride monomers and up to 20% by weight, based on the vinyl chloride content, of α-olefinically unsaturated monomers copolymerizable with vinyl chloride in water in the presence of monomer-soluble radical-initiators using emulsifiers in the pre-homogenized aqueous phase, the improvement consisting of employing from 0.01 to 0.5% by weight, based on the weight of the water, of a water-soluble acidic polymer comprising a homopolymer of an acid selected from the group consisting of acrylic acid, methacrylic acid, fumaric acid, maleic acid and itaconic acid, or an acid anhydride thereof, or a copolymer of said acid with up to 80% by weight of monoolefinically unsaturated monomer copolymerizable with said acid, or a water-soluble salt thereof in the pre-homogenized aqueous phase, the emulsifiers comprising in part from about 0.001 to 0.1% by weight, based on the weight of the water, of an emulsifier having at least one perfluorinated alkyl group having a chain length of from about 6 to 20 carbon atoms.

2. The process of claim 1 wherein from about 0.3 to 3% by weight, based on the weight of the water, of alkali metal and/or ammonium salts of carboxylic acids having from about 8 to 20 carbon atoms are used as emulsifiers.

3. The process of claim 1 wherein the emulsifiers comprise from about 0.3 to 3% by weight, based on the weight of the water, of alkali metal and/or ammonium salts of carboxylic acids having from about 8 to 20 carbon atoms and from about 0.001 to 0.1% by weight, based on the weight of the water, of an emulsifier having at least one perfluorinated alkyl group having a chain length of from about 6 to 20 carbon atoms.

4. The process of claim 1 wherein the emulsifier having at least one perfluorinated alkyl group is selected from the group consisting of perfluoroalkyl sulfonates, perfluoroalkylcarboxylic acid alkoxylates, perfluoroalkyl alkoxylates, and quaternary ammonium salts of perfluoroalkylsulfonic acids.

5. The process of claim 1 wherein the water-soluble acidic polymer is a 1:1 copolymer of maleic acid anhydride and styrene, ethylene, or vinyl methyl ether.

6. The process of claim 1 wherein the mono-olefinically unsaturated monomer is selected from the group consisting of styrene, lower alkenylenes, vinyl esters, and vinyl ethers.

7. The process of claim 1 wherein the water-soluble acidic polymer is a copolymer in which for every five units of comonomer at least one unit having carboxylic acid groups is present.

8. The process of claim 1 wherein the water-soluble acidic polymer is a copolymer in which the ratio of monomer units to carboxylic acid groups is from about 1:0.5 to 1:1.5.

9. The process of claim 8 wherein the ratio is 1:1.

* * * * *